United States Patent Office 2,887,470
Patented May 19, 1959

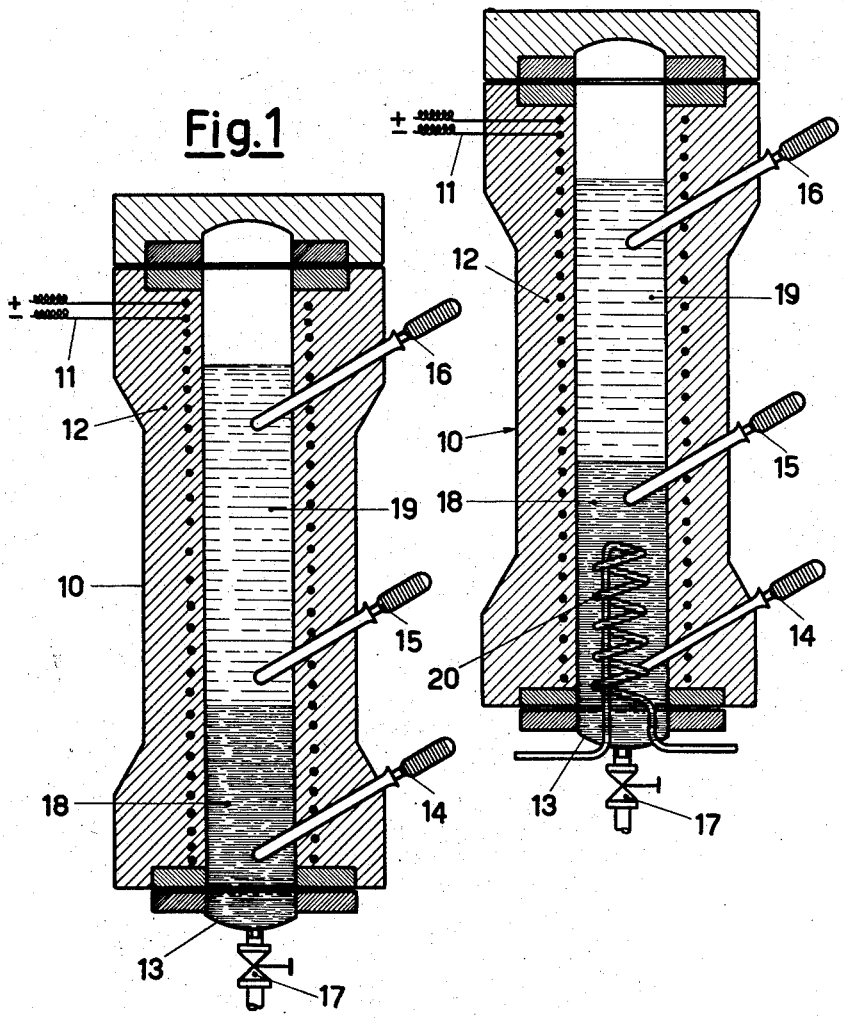

2,887,470
PROCESS AND APPARATUS FOR SEPARATING AND PURIFYING CONDENSATIONS PRODUCTS

Werner Muench, Luigi Notarbartolo, and Enrico Crosio, Milan, Italy, assignors, by mesne assignments, to Snia Viscosa Societa Nazionale Industria Applicazioni Viscosa S.p.A., Milan, Italy, an Italian company Application November 22, 1954, Serial No. 470,422

Claims priority, application Italy December 31, 1953

6 Claims. (Cl. 260—78)

The present invention relates to a process and apparatus for separating and purifying organic condensation products of the kind hereinafter described. It is described hereinafter with reference to the products of condensation of amino undecanoic acid, but it is not limited thereto and applies obviously also to the treatment of other condensation products, in particular polyamidic products.

It is known that 11-amino undecanoic acid (which can be obtained with conventional methods from castor oil and constitutes the raw material for the preparation of highly molecular polyamides wherefrom filaments, textile fibres and moulded or extruded articles and the like are obtained) can hardly be prepared in industrial scale in the perfectly pure state. Hence it is subjected to purification through repeated washing and re-crystallizing, whereby a white paste containing 50 to 55% of water is obtained. In this water there always remain traces of impurities which impair the quality of the final polyamide products and are an obstacle to their preparation. It was proposed to purify amino undecanoic acid by means of a process which consists essentially in carrying out a partial condensation, viz. a condensation carried on until obtaining a pre-condensate having low molecular weight as compared with the desired final polyamidic products, by means of heating of the acid containing water and if needed after previous addition of other reactants, during a short time, up to polyamide forming temperatures, viz. beyond 180° C. This pre-condensate is insoluble in water and fluid at those temperatures; thus a separation is obtained of the pre-condensate from the water, with the formation of two distinct layers, of which the aqueous layer contains the greater part of the impurities. That process forms the subject-matter of our co-pending application Serial No. 431,288 filed May 20, 1954, now U.S. Patent No. 2,829,127.

If carried out in industrial scale, said process offers some difficulties owing to the fact that the specific gravities of the pre-condensate and that of water are nearly equal. If as usual the process is carried out in an autoclave, there is no sharp line of separation between the water and the pre-condensate; water remains included in the latter so that it is even impossible to separate the two reaction components from each other in the liquid state.

Separation can be improved somewhat by adding to the reaction mixture some sand and other inert materials having higher specific gravity, which distribute prevailingly in the pre-condensate thus increasing the specific gravity thereof. However, in this way too, in the most favourable case it is possible only to obtain part of the pre-condensate free from included water. Under the conditions described, it is possible to separate completely the water from the pre-condensate only if the latter has solidified. However, in this case too a complete separation from the water in the liquid state offers some difficulties in that it is enclosed in the partly very small cavities of the solid pre-condensate and, therefore, it can be eliminated completely only after mechanical comminution of the latter. The process and apparatus according to the present invention permit to carry out a perfect and a very sharp separation between the liquid or solid pre-condensate, and the water.

The process according to the invention consists in creating a zone of the reaction space, preferably on the bottom thereof, the temperature of which is somewhat lower than the average temperature of the remaining space and, in particular, of the upper end thereof and of the material contained therein.

The apparatus according to the invention consists in a reaction vessel (autoclave) provided with means for creating such a zone of lower temperature, preferably on the bottom of said vessel. Consequently in said zone the specific gravity as well as and above all the viscosity of the pre-condensate are increased so that the latter can follow with less of ease the streams forming in water.

These streams too are reduced because the upper part of the reaction vessel (autoclave) is kept warmer than its bottom and consequently once the pressure-temperature equilibrium has established, only little or no water evaporates from the surface. Under these conditions the pre-condensate is collected completely free from included water at the bottom of the vessel in such a manner that after cooling down it forms a solid block free from any incorporated water, with an absolutely sharp line of separation between the pre-condensate and the water; it is also possible to tap it with an outlet valve provided at the bottom, in the liquid state but without any included water.

The water can be drained in the liquid state by way of a piping provided with an outlet valve placed above the pre-condensate separated, if needed inserting filters, with the aid of a pump, of a counter-pressure vessel or of any other means. It is only indispensable to avoid a heavy drop of internal pressures, to prevent water from starting boiling as long as there are still sensible amounts of liquid pre-condensate in the autoclave.

Having recourse to this process it is possible to work with semi-continuous or entirely continuous operation in separating the insoluble pre-condensates of 11-undecanoic acid from water. In the first case (semi-continuous operation) it is convenient first to draw off the pre-condensate while still liquid, then the water; in this way, the cycle may be repeated as many times as needed. In the second case (entirely continuous operation) the pre-condensate and water are drawn off continuously as fresh solution is being fed.

The apparatus according to the invention is of simple structure. For instance, with autoclaves having no large size it is possible to insulate carefully the whole autoclave, cover included, leaving out partly or totally from the insulation its bottom. With autoclaves of larger size it is possible, moreover, to provide their bottoms with ribs or cooling fins which conveniently are made to extend into the liquid; in both cases, cooling is provided by the aid of external air.

It is also possible to provide in the lower part of the autoclave a coil wherein any cooling fluid may be circulated. In the simplest case the latter will be still air but it may even be a pre-heated liquid at temperatures by little higher or lower than the melting point of the condensate. In particular, above all if working with an entirely closed cycle, it is possible to employ as a cooling fluid the feed suspension or solution of the amino acid in water, which is pre-heated to few degrees above the melting point of the pre-condensate. The coil is open at its end in the middle of the autoclave and so the fresh solution is fed.

The invention will be better understood with reference to the accompanying drawings, wherein Figs. 1 and 2 represent diagrammatically reaction vessels provided with the means necessary to put the invention to practice, according to two different embodiments given merely by way of example.

With reference firstly to Fig. 1, numeral 10 indicates in a generic way a tubular autoclave which just by way of example may be supposed to have 3 litres capacity and 70 cm. length, and which is charged with 2.5 kg. of a paste constituted by about 50% of 11-amino undecanoic acid and by about 50% of water. The autoclave is heated over its length as diagrammatically indicated by the resistor 11, and it is well insulated both at its sides and at top, as diagrammatically indicated at 12. In order to provide a cooler zone, the bottom 13 of the autoclave is neither insulated nor heated. The whole autoclave is heated for one hour and a half in such a way that the thermometer 14, inserted in the autoclave in the proximity of its bottom, indicates 220° C., while the thermometers 15 and 16, inserted e.g. at about 20 and about 45 cm. height respectively, indicate respectively 262° C. and 265° C. Then the valve 17 applied to the bottom of the autoclave is opened, whereby exclusively the pre-condensate 18 is discharged, which constitutes the bottom layer formed in said autoclave, while the water constitutes the upper layer 19. During the drawing off the temperature of the thermometer 14 rises slowly up to about 230° C. while that of the others remains substantially unvaried. In this way, it is possible to discharge about the 9/10 of the pre-condensate from the autoclave without any water coming out together. The water may be discharged in any convenient manner, e.g. drawing it off into a vessel under counterpressure by means of a pipe to be fitted into the autoclave from top. Then the autoclave may be charged again with fresh amino acid suspension or solution, conveniently pre-heated, without allowing the autoclave to cool down, and the cycle may be repeated as many times as needed. If instead of discharging the pre-condensate in the molten state, the autoclave is allowed to cool down and then opened, the pre-condensate is obtained in the form of a sharply confined block without any inclusion of water.

Fig. 2 illustrates a second example of embodiment quite similar to the preceding one and similar in operation, but distinct in that in the bottom zone of the autoclave 10 there is provided a cooling coil 20 wherein a gas is circulated, which may even be air from the surrounding room, or a liquid, to lower to the desired extent the temperature of said zone. The remaining parts are indicated with the same numerals as in Fig. 1. It is evident that under these conditions also the bottom 13 of the autoclave might be more or less insulated, instead of being without any insulation as shown. The coil 20 might open inside the autoclave and the fresh amino acid solution or suspension might be fed therethrough, being pre-heated to few degrees above the melting point of the pre-condensate and, therefore, would act as a cooling fluid; then the pre-condensate as well as the water would be let out continuously.

The invention has been described with reference to the purification and separation of pre-condensate of 11-amino undecanoic acid from water, but, it can be applied also to different products having to undergo an analogous separation, in particular to other polyamidic pre-condensates such as e.g. those obtainable in a well-known manner from other amino acids, or from lactams or from the condensation of bifunctional amines and acids.

What we claim is:

1. A method of removing water soluble impurities from raw monomeric materials for the preparation of synthetic linear high molecular polyamides, comprising the steps of introducing a mixture of said raw monomeric materials and water, said mixture containing at least 50% by weight of water, in a vertically elongated reaction space, heating said space to temperatures above 180° C. concurrently maintaining in said space a pressure sufficient to prevent the water from boiling, continuing said heating while maintaining the lowermost zone of said space at a temperature lower than those obtaining in the balance of said space and while maintaining the water in the liquid state, until a low molecular weight polyamide has formed, said polyamide and said water containing the water soluble impurities forming two distinct layers, the polyamide layer being of greater density, positioned in said lowermost zone of said space, and substantially free from water soluble impurities, the water layer being superimposed thereon, and thereafter separating said water containing said water soluble impurities from said low molecular weight polyamide and discharging the latter from said reaction space.

2. A method according to claim 1, wherein the low molecular weight polyamide is discharged from the reaction space by tapping it from the bottom while the lowermost zone of said reaction space is maintained at a temperature above the melting point of said polyamide.

3. A method according to claim 1, wherein the low molecular weight polyamide is discharged from the reaction space by cooling the lowermost zone of said space to a temperature below the melting point of the low molecular weight polyamide and then removing the solidified polyamide from said space.

4. A method according to claim 1, wherein the mixture of monomeric raw materials and water is introduced in the reaction space in a continuous stream, and the low molecular weight polyamide is continuously tapped in the molten state from the lowermost zone of said space, the water being discharged continuously in the liquid state from an uppermost zone of said space.

5. A method according to claim 1, wherein the mixture of monomeric raw materials and water is fed in a continuous stream to a zone of the reaction space above the lowermost zone thereof, through a piping passing through said lowermost zone, said mixture being at a sufficiently low temperature to cool said lowermost zone to the desired extent, and wherein the low molecular weight polyamide is continuously tapped in the molten state from said lowermost zone, the water being discharged continuously in the liquid state from an uppermost zone of the reaction space.

6. A method comprising carrying out the steps recited in claim 1, withdrawing most of the low molecular weight polyamide in the molten state from the lowermost portion of the reaction space and discharging most of the water in the liquid state from an uppermost zone of said space while maintaining the same at the same temperatures and pressures at which the low molecular weight polyamide has been formed, and cyclically repeating all of the aforementioned steps.

References Cited in the file of this patent

UNITED STATES PATENTS

| | | |
|---|---|---|
| 2,163,636 | Spanagel | June 27, 1939 |
| 2,241,321 | Schlack | May 6, 1941 |
| 2,326,326 | Breedis | Apr. 10, 1943 |
| 2,375,256 | Soday | May 8, 1945 |
| 2,562,796 | Koch | July 31, 1951 |
| 2,714,101 | Amos et al. | July 26, 1955 |

FOREIGN PATENTS

| | | |
|---|---|---|
| 994,244 | France | Aug. 3, 1951 |